(12) United States Patent
Chang et al.

(10) Patent No.: US 12,366,482 B2
(45) Date of Patent: Jul. 22, 2025

(54) INFRARED DEVICE AND METHOD FOR MANUFACTURING THE SAME

(71) Applicant: Industrial Technology Research Institute, Hsinchu (TW)

(72) Inventors: Heng-Chung Chang, Taichung (TW); Chih-Ya Tsai, Taichung (TW); Hui-Chi Su, Kaohsiung (TW); Jing-Yuan Lin, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 484 days.

(21) Appl. No.: 17/993,942

(22) Filed: Nov. 24, 2022

(65) Prior Publication Data

US 2023/0366739 A1  Nov. 16, 2023

(30) Foreign Application Priority Data

May 10, 2022 (TW) .................................. 111117466

(51) Int. Cl.
*G01J 5/20* (2006.01)
(52) U.S. Cl.
CPC ....................................... *G01J 5/20* (2013.01)
(58) Field of Classification Search
None
See application file for complete search history.

(56) References Cited

U.S. PATENT DOCUMENTS

| | | | |
|---|---|---|---|
| 5,260,225 A | 11/1993 | Liu et al. | |
| 6,274,462 B1 | 8/2001 | Fiorini et al. | |
| 6,690,014 B1 | 2/2004 | Gooch et al. | |
| 6,707,121 B2 | 3/2004 | De Moor et al. | |
| 7,075,081 B2 | 7/2006 | Fiorini et al. | |
| 7,557,027 B2 | 6/2009 | Witvrouw et al. | |
| 8,062,497 B2 | 11/2011 | Witvrouw et al. | |
| 8,587,083 B2 | 11/2013 | Malm | |
| 10,101,212 B1* | 10/2018 | Cleary | G01J 5/10 |
| 10,840,399 B1 | 11/2020 | Rana et al. | |
| 2001/0055833 A1 | 12/2001 | Fiorini et al. | |
| 2005/0012040 A1 | 1/2005 | Fiorini et al. | |

(Continued)

FOREIGN PATENT DOCUMENTS

TW         420826        2/2001

OTHER PUBLICATIONS

Taiwan Patent Office, Office Action, Patent Application No. 111117466, Apr. 10, 2023, Taiwan.

(Continued)

*Primary Examiner* — Marcus H Taningco (57) ABSTRACT

An infrared device is provided. The infrared device includes a substrate, a metal layer, a first semiconductor layer, an absorber layer, and a second semiconductor layer. The metal layer is disposed on the substrate. The first semiconductor layer is disposed on the substrate and electrically connected to the metal layer. A cavity is formed between the first semiconductor layer and the metal layer. The absorber layer is disposed on the first semiconductor layer. The second semiconductor layer is disposed on the absorber layer and electrically connected to the first semiconductor layer. The TCR of the first semiconductor layer is different from that of the second semiconductor layer.

20 Claims, 10 Drawing Sheets

(56) References Cited

U.S. PATENT DOCUMENTS

| | | | | |
|---|---|---|---|---|
| 2006/0186339 | A1* | 8/2006 | Sasaki | G01J 5/20 |
| | | | | 250/338.1 |
| 2009/0140148 | A1 | 6/2009 | Yang et al. | |
| 2010/0053385 | A1* | 3/2010 | Choe | H04N 25/585 |
| | | | | 348/E5.091 |
| 2011/0049366 | A1* | 3/2011 | Yang | G01J 5/04 |
| | | | | 257/E31.093 |
| 2012/0049324 | A1* | 3/2012 | Le Neel | H01L 23/5228 |
| | | | | 438/384 |
| 2012/0139078 | A1 | 6/2012 | Malm | |
| 2013/0259086 | A1* | 10/2013 | Lane | G01J 5/046 |
| | | | | 374/121 |

OTHER PUBLICATIONS

Sedky, Sherif, et al. "Characterization and optimization of infrared poly SiGe bolometers", IEEE Transactions on Electron Devices, Apr. 1999, pp. 675-682, vol. 46, No. 4, IEEE, US.

Ambrosio, Roberto, et al. "An overview of uncooled infrared sensors technology based on amorphous silicon and silicon germanium alloys", Physica Status Solidi C, Feb. 2010, pp. 1180-1183, Wiley-VCH, US.

Leonov, Vladimir Nikolaevic, et al. "Optimization of design and technology for uncooled poly-SiGe microbolometer arrays", Infrared Detectors and Focal Plane Arrays VII, 2002, 13 pages, vol. 4721, Proceedings, US.

* cited by examiner

INFRARED DEVICE AND METHOD FOR MANUFACTURING THE SAME

CROSS REFERENCE TO RELATED APPLICATIONS

This Application claims priority of Taiwan Patent Application No. 111117466, filed on May 10, 2022, the entirety of which is incorporated by reference herein.

TECHNICAL FIELD

The present disclosure relates to an infrared device, and more particularly to an infrared device configured with semiconductor layers with different temperature coefficient of resistance (TCR).

BACKGROUND

In general, infrared devices could be divided into two categories, bulk processing and surface processing. No matter fabricated bybulk or surface processing technology, a cavity is often made in the device to achieve thermal insulation.

In addition to the cavity structure above the IC circuit, the infrared devices fabricated by the surface processing technology also include structures such as sensing thin-films and supporting beam. In the supporting beamdesign, attention should be paid to whether residual stress control is adequate, whether the resistance matches the IC circuit, and whether the thermal insulation between the supporting beam and the substrate is adequate.

SUMMARY

In accordance with one embodiment of the present disclosure, an infrared device is provided. The infrared device includes a substrate, a metal layer, a first semiconductor layer, an absorber layer, and a second semiconductor layer. The metal layer is disposed on the substrate. The first semiconductor layer is disposed on the substrate and electrically connected to the metal layer. A cavity is formed between the first semiconductor layer and the metal layer. The absorber layer is disposed on the first semiconductor layer. The second semiconductor layer is disposed on the absorber layer and electrically connected to the first semiconductor layer. The temperature coefficient of resistance (TCR) of the first semiconductor layer is different from that of the second semiconductor layer.

In accordance with one embodiment of the present disclosure, an infrared device is provided. The infrared device includes a substrate, a metal layer, a first silicon-germanium layer, an absorber layer, and a second silicon-germanium layer. The metal layer is disposed on the substrate. The first silicon-germanium layer is disposed on the substrate and electrically connected to the metal layer. A cavity is formed between the first silicon-germanium layer and the metal layer. The absorber layer is disposed on the first silicon-germanium layer. The second silicon-germanium layer is disposed on the absorber layer and electrically connected to the first silicon-germanium layer. The temperature coefficient of resistance (TCR) of the first silicon-germanium layer is different from that of the second silicon-germanium layer.

In accordance with one embodiment of the present disclosure, a method for manufacturing an infrared device is provided. The method includes the following steps. A substrate is provided. A metal layer is formed on the substrate. A sacrificial layer is formed on the metal layer. A first silicon-germanium layer is formed on the sacrificial layer and electrically connected to the metal layer. An absorber layer is formed on the first silicon-germanium layer. A second silicon-germanium layer is formed on the absorber layer and electrically connected to the first silicon-germanium layer. The temperature coefficient of resistance (TCR) of the first silicon-germanium layer is different from that of the second silicon-germanium layer. The sacrificial layer is removed to form a cavity between the first silicon-germanium layer and the metal layer.

A detailed description is given in the following embodiments with reference to the accompanying drawings.

DETAILED DESCRIPTION

Figure 1:
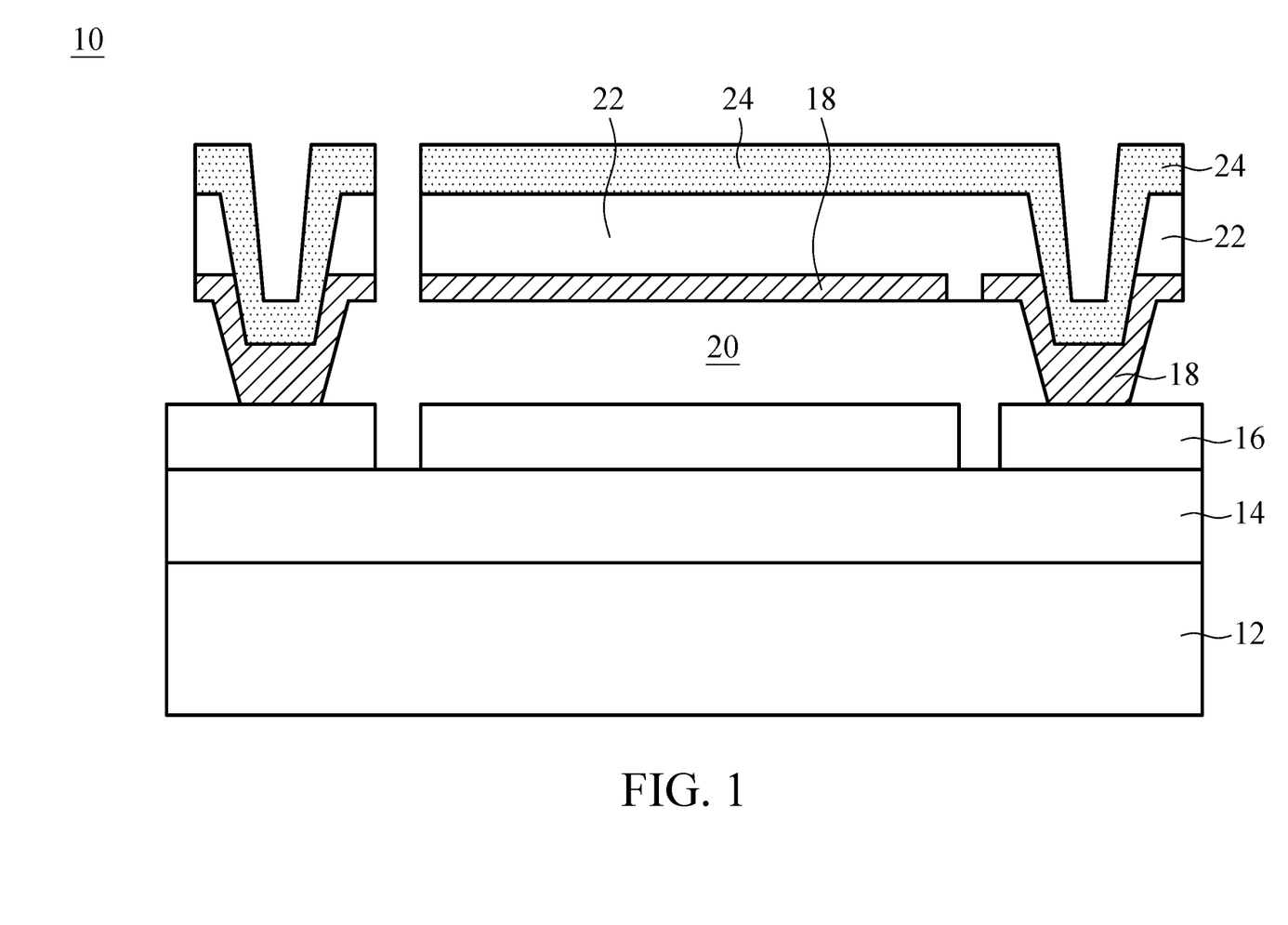
FIG. 1 is a cross-sectional view of an infrared device in accordance with one embodiment of the present disclosure.

Referring to FIG. 1, in accordance with one embodiment of the present disclosure, an infrared device 10 is provided. FIG. 1 is a cross-sectional view of the infrared device 10.

As shown in FIG. 1, the infrared device 10 includes a substrate 12, an insulating layer 14, a metal layer 16, a first semiconductor layer 18, a cavity 20, an absorber layer 22 and a second semiconductor layer 24. The insulating layer 14 is disposed on the substrate 12. The metal layer 16 is disposed on the insulating layer 14. The first semiconductor layer 18 is disposed on the substrate 12 and electrically connected to the metal layer 16. A cavity 20 is formed between the first semiconductor layer 18 and the metal layer 16. The absorber layer 22 is disposed on the first semiconductor layer 18. The second semiconductor layer 24 is disposed on the absorber layer 22 and electrically connected to the first semiconductor layer 18. Specifically, the temperature coefficient of resistance (TCR) of the first semiconductor layer 18 is different from that of the second semiconductor layer 24.

In some embodiments, the substrate 12 may include a rigid substrate or a flexible substrate. In some embodiments, the rigid substrate may include a silicon substrate or a glass substrate, but the present disclosure is not limited thereto, and other suitable rigid-substrate materials are also applicable to the present disclosure. In some embodiments, the flexible substrate may include a polyimide (PI) substrate, a polyethylene terephthalate (PET) substrate or a polycarbonate (PC) substrate, but the present disclosure is not limited thereto, and other suitable flexible-substrate materials are also applicable to the present disclosure.

In some embodiments, the insulating layer 14 may include organic insulating materials or inorganic insulating materials, such as silicon oxide, silicon nitride, silicon oxynitride or a combination thereof, but the present disclosure is not limited thereto, and other suitable organic insulating materials or inorganic insulating materials are also applicable to the present disclosure.

In some embodiments, the metal layer 16 may include molybdenum, aluminum, copper, titanium or a combination thereof, such as molybdenum/aluminum/molybdenum, titanium/aluminum/titanium or titanium/aluminum/molybdenum, but the present disclosure is not limited thereto, and other suitable metal conductive materials are also applicable to the present disclosure. In addition to serving as a conductive layer for electrical connection, the metal layer 16 can also act as a reflective layer to increase the efficiency of the component to absorb infrared light.

In some embodiments, the first semiconductor layer 18 and the second semiconductor layer 24 may include silicon germanium (SiGe), but the present disclosure is not limited thereto, and other semiconductor materials that can vary in temperature coefficient of resistance (TCR) by adjusting process parameters (such as temperature or flow rate of gas) are also applicable to the present disclosure.

In some embodiments, the absorber layer 22 may include silicon oxide, silicon nitride or silicon oxynitride, but the present disclosure is not limited thereto, and other suitable infrared absorbing materials are also applicable to the present disclosure.

In some embodiments, the temperature coefficient of resistance (TCR) of the first semiconductor layer 18 is smaller than that of the second semiconductor layer 24. In some embodiments, the temperature coefficient of resistance (TCR) of the second semiconductor layer 24 is about 20 to 40 times that of the first semiconductor layer 18. In some embodiments, the temperature coefficient of resistance (TCR) of the first semiconductor layer 18 is between about 0.02% and 0.2%. In some embodiments, the temperature coefficient of resistance (TCR) of the second semiconductor layer 24 is between about 0.8% and 8%.

Figure 2:
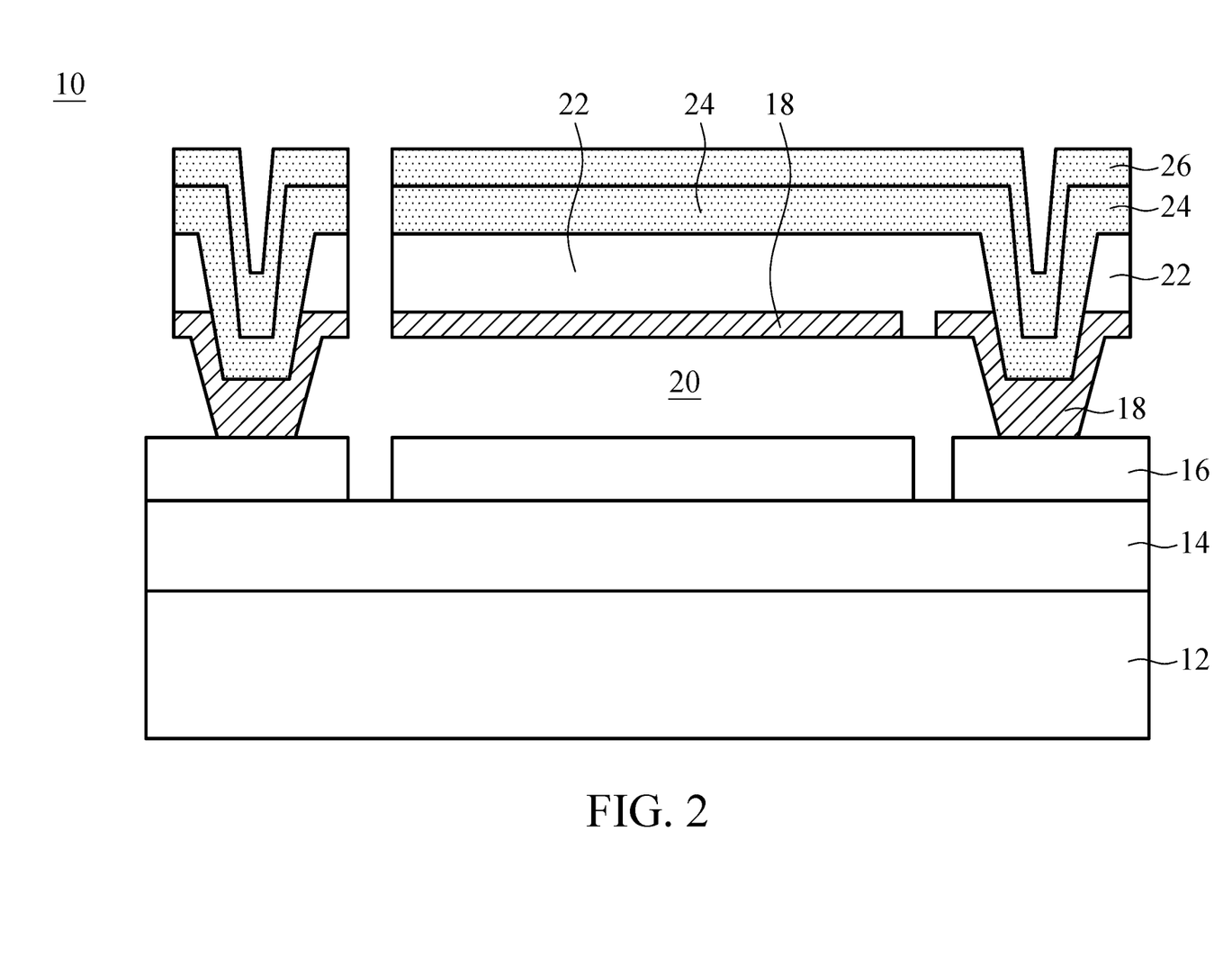
FIG. 2 is a cross-sectional view of an infrared device in accordance with one embodiment of the present disclosure.

Referring to FIG. 2, in accordance with one embodiment of the present disclosure, an infrared device 10 is provided. FIG. 2 is a cross-sectional view of the infrared device 10.

As shown in FIG. 2, the infrared device 10 includes a substrate 12, an insulating layer 14, a metal layer 16, a first semiconductor layer 18, a cavity 20, an absorber layer 22, a second semiconductor layer 24 and a third semiconductor layer 26. The insulating layer 14 is disposed on the substrate 12. The metal layer 16 is disposed on the insulating layer 14. The first semiconductor layer 18 is disposed on the substrate 12 and electrically connected to the metal layer 16. A cavity 20 is formed between the first semiconductor layer 18 and the metal layer 16. The absorber layer 22 is disposed on the first semiconductor layer 18. The second semiconductor layer 24 is disposed on the absorber layer 22 and electrically connected to the first semiconductor layer 18. The third semiconductor layer 26 is disposed on the second semiconductor layer 24 and electrically connected to the first semiconductor layer 18. Specifically, the temperature coefficient of resistance (TCR) of the first semiconductor layer 18 is different from the total temperature coefficient of resistance (TCR) of the second semiconductor layer 24 and the third semiconductor layer 26.

In some embodiments, the substrate 12 may include a rigid substrate or a flexible substrate. In some embodiments, the rigid substrate may include a silicon substrate or a glass substrate, but the present disclosure is not limited thereto, and other suitable rigid-substrate materials are also applicable to the present disclosure. In some embodiments, the flexible substrate may include a polyimide (PI) substrate, a polyethylene terephthalate (PET) substrate or a polycarbonate (PC) substrate, but the present disclosure is not limited thereto, and other suitable flexible-substrate materials are also applicable to the present disclosure.

In some embodiments, the insulating layer 14 may include organic insulating materials or inorganic insulating materials, such as silicon oxide, silicon nitride, silicon oxynitride or a combination thereof, but the present disclosure is not limited thereto, and other suitable organic insulating materials or inorganic insulating materials are also applicable to the present disclosure.

In some embodiments, the metal layer 16 may include molybdenum, aluminum, copper, titanium or a combination thereof, such as molybdenum/aluminum/molybdenum, titanium/aluminum/titanium or titanium/aluminum/molybdenum, but the present disclosure is not limited thereto, and other suitable metal conductive materials are also applicable to the present disclosure.

In some embodiments, the first semiconductor layer 18, the second semiconductor layer 24 and the third semiconductor layer 26 may include silicon germanium (SiGe), but the present disclosure is not limited thereto, and other semiconductor materials that can vary in temperature coefficient of resistance (TCR) by adjusting process parameters (such as temperature or flow rate of gas) are also applicable to the present disclosure.

In some embodiments, the absorber layer 22 may include silicon oxide, silicon nitride or silicon oxynitride, but the present disclosure is not limited thereto, and other suitable infrared absorbing materials are also applicable to the present disclosure.

In some embodiments, the temperature coefficient of resistance (TCR) of the first semiconductor layer 18 is smaller than the total temperature coefficient of resistance (TCR) of the second semiconductor layer 24 and the third semiconductor layer 26. In some embodiments, the total temperature coefficient of resistance (TCR) of the second semiconductor layer 24 and the third semiconductor layer 26 is about 20 to 40 times the temperature coefficient of resistance (TCR) of the first semiconductor layer 18. In some embodiments, the temperature coefficient of resistance (TCR) of the first semiconductor layer 18 is between about 0.02% and 0.2%. In some embodiments, the total temperature coefficient of resistance (TCR) of the second semiconductor layer 24 and the third semiconductor layer 26 is between about 0.8% and 8%.

Referring to FIGS. 3A to 3H, in accordance with one embodiment of the present disclosure, a method for manufacturing an infrared device is provided. FIGS. 3A to 3H are cross-sectional views of the method for manufacturing an infrared device.

Figure 3A:
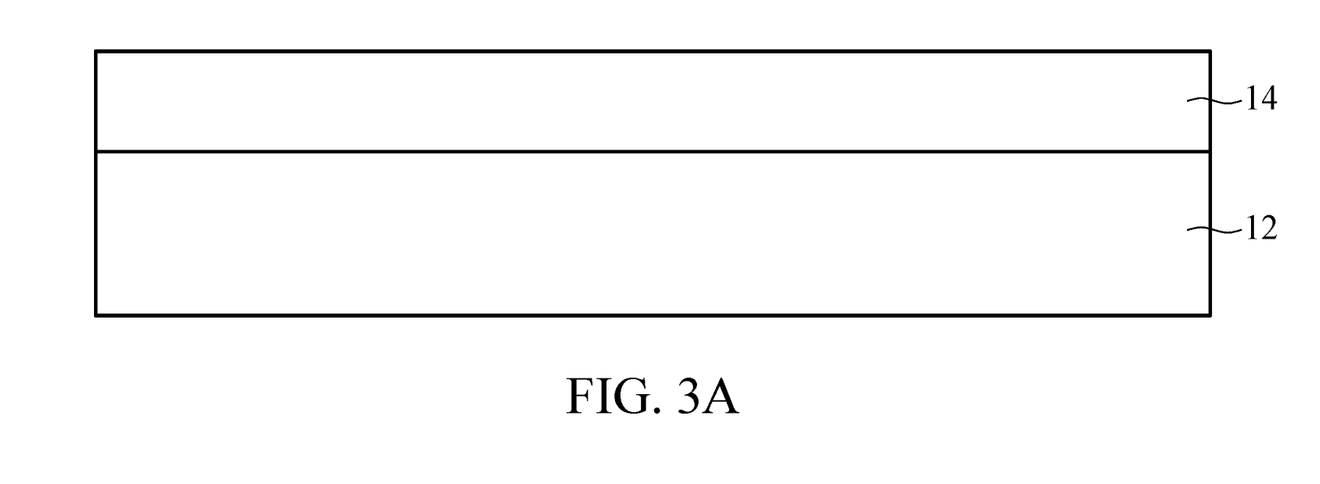
FIGS. 3A to 3H are cross-sectional views of a method for manufacturing an infrared device in accordance with one embodiment of the present disclosure.

As shown in FIG. 3A, a substrate 12 is provided. Next, an insulating layer 14 is formed on the substrate 12. In some embodiments, the insulating layer 14 may be formed by, for example, sputtering, spin-coating, chemical vapor deposition (CVD), low-pressure chemical vapor deposition (LPCVD), low-temperature chemical vapor deposition (LTCVD), rapid thermal chemical vapor deposition (RTCVD), plasma-enhanced chemical vapor deposition (PECVD), atomic layer deposition (ALD), physical vapor deposition (PVD), molecular beam deposition (MBD), another suitable method, or a combination thereof.

Figure 3B:
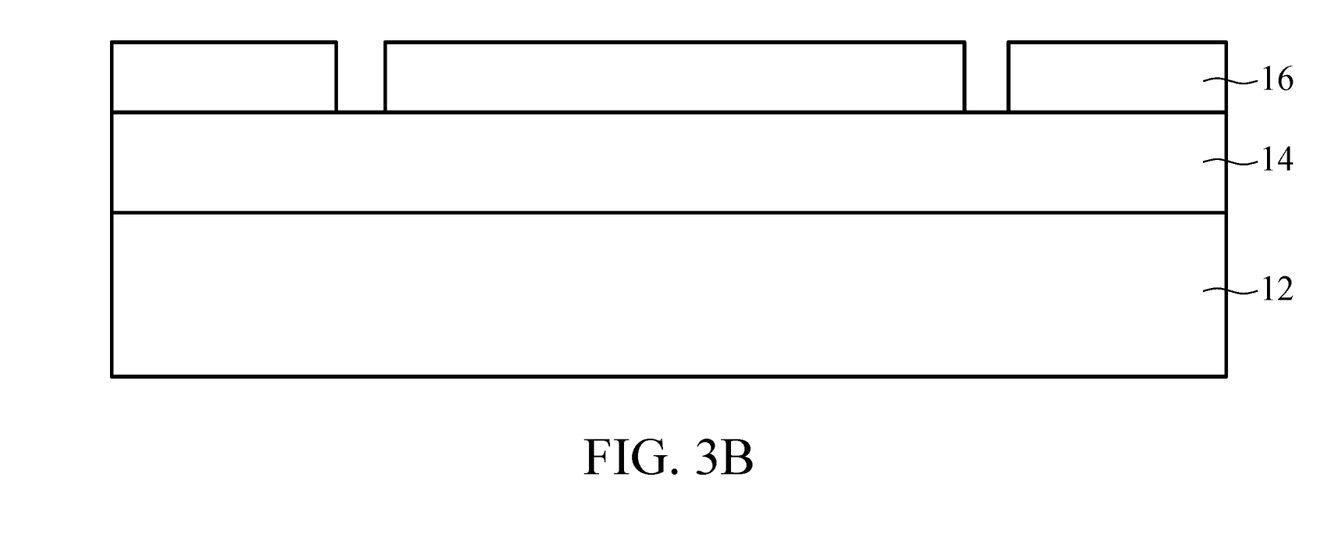

As shown in FIG. 3B, a metal layer 16 is formed on the insulating layer 14 and patterned. In some embodiments, the metal layer 16 may be formed by, for example, sputtering, spin-coating, chemical vapor deposition (CVD), low-pressure chemical vapor deposition (LPCVD), low-temperature chemical vapor deposition (LTCVD), rapid thermal chemical vapor deposition (RTCVD), plasma-enhanced chemical vapor deposition (PECVD), atomic layer deposition (ALD), physical vapor deposition (PVD), molecular beam deposition (MBD), another suitable method, or a combination thereof. Next, a patterned photoresist layer (not shown) is used as an etching mask. The metal layer 16 is patterned by an etching process, for example, reactive ion etch (RIE), neutral beam etch (NBE), another suitable method, or a combination thereof, to form a patterned metal layer 16. The patterned photoresist layer is then removed by an etching process or another suitable method.

Figure 3C:
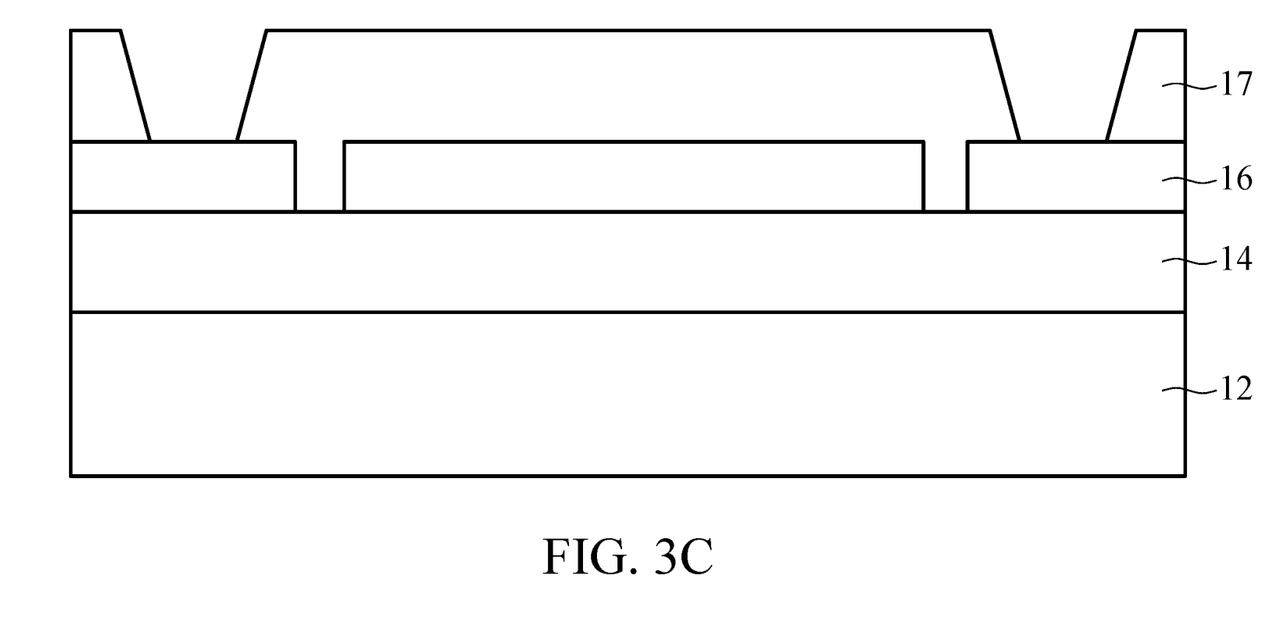

As shown in FIG. 3C, a sacrificial layer 17 is formed on the metal layer 16 and patterned to expose a portion of the metal layer 16. In some embodiments, the sacrificial layer 17 may include germanium, silicon oxide, or polyimide (PI), but the present disclosure is not limited thereto, and other materials suitable for the sacrificial layer are also applicable to the present disclosure. In some embodiments, the sacrificial layer 17 may be formed by, for example, sputtering, spin-coating, chemical vapor deposition (CVD), low-pressure chemical vapor deposition (LPCVD), low-temperature chemical vapor deposition (LTCVD), rapid thermal chemical vapor deposition (RTCVD), plasma-enhanced chemical vapor deposition (PECVD), atomic layer deposition (ALD), physical vapor deposition (PVD), molecular beam deposition (MBD), another suitable method, or a combination thereof. Next, a patterned photoresist layer (not shown) is used as an etching mask. The sacrificial layer 17 is patterned by an etching process, for example, reactive ion etch (RIE), neutral beam etch (NBE), another suitable method, or a combination thereof, to form a patterned sacrificial layer 17, exposing a portion of the metal layer 16. The patterned photoresist layer is then removed by an etching process or another suitable method. In order to manufacture a proper infrared reflective cavity, it is necessary to select an appropriate thickness of the sacrificial layer in accordance with the infrared wavelength band to be sensed.

Figure 3D:
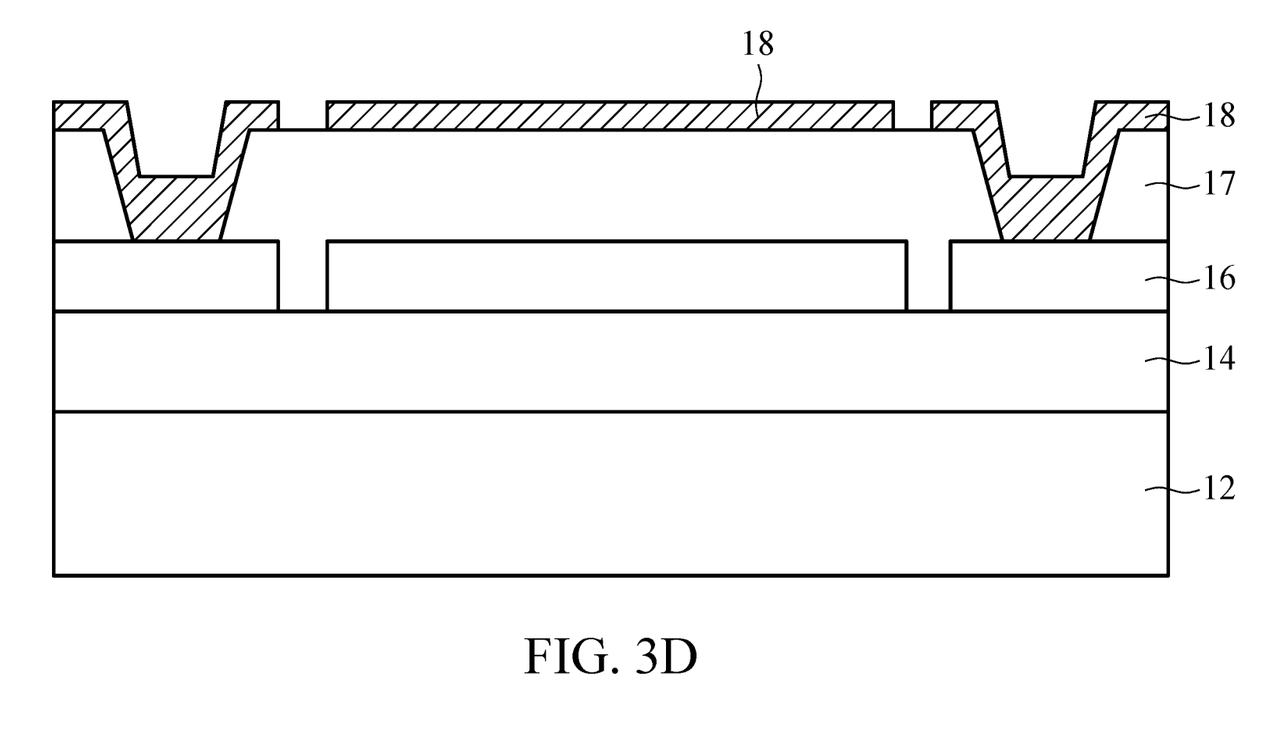

As shown in FIG. 3D, a first semiconductor layer 18 is formed on the patterned sacrificial layer 17 and electrically connected to the metal layer 16. The first semiconductor layer 18 is patterned. In some embodiments, the first semiconductor layer 18 may be formed by, for example, sputtering, spin-coating, chemical vapor deposition (CVD), low-pressure chemical vapor deposition (LPCVD), low-temperature chemical vapor deposition (LTCVD), rapid thermal chemical vapor deposition (RTCVD), plasma-enhanced chemical vapor deposition (PECVD), atomic layer deposition (ALD), physical vapor deposition (PVD), molecular beam deposition (MBD), another suitable method, or a combination thereof. Next, a patterned photoresist layer (not shown) is used as an etching mask. The first semiconductor layer 18 is patterned by an etching process, for example, reactive ion etch (RIE), neutral beam etch (NBE), another suitable method, or a combination thereof, to form a patterned first semiconductor layer 18. The patterned photoresist layer is then removed by an etching process or another suitable method. In some embodiments, in the step of forming the first semiconductor layer 18, when a deposition method is used and silicon germanium (SiGe) is used as the material of the first semiconductor layer 18, the operating temperature is between about 400° C. and 470° C. The flow rate of silane ($SiH_4$) gas is between about 5 sccm and 50 sccm. The flow rate of germane ($GeH_4$) gas is between about 1 sccm and 12 sccm.

Figure 3E:
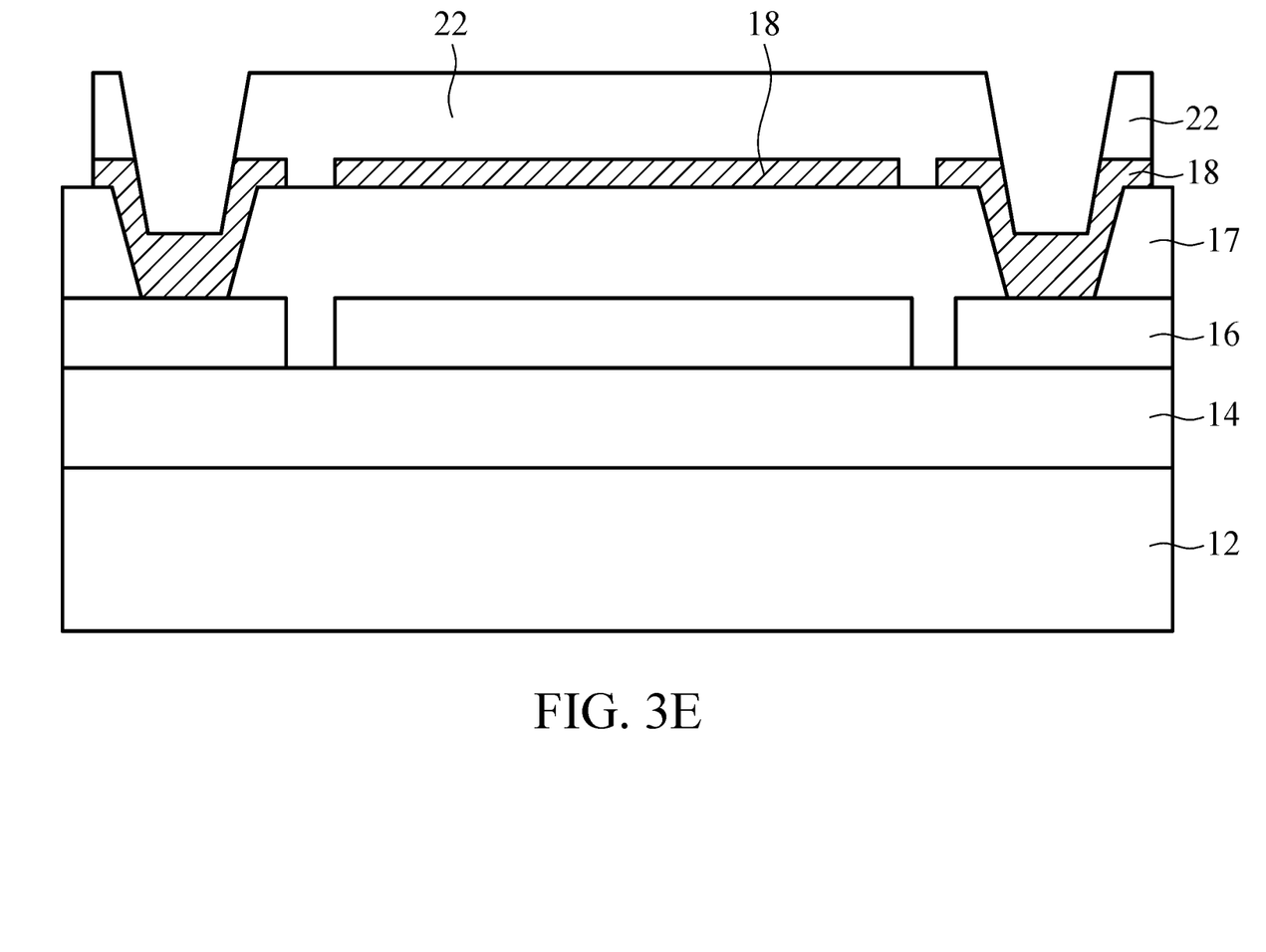

As shown in FIG. 3E, an absorber layer 22 is formed on the first semiconductor layer 18 and patterned to expose a portion of the first semiconductor layer 18. In some embodiments, the absorber layer 22 may be formed by, for example, sputtering, spin-coating, chemical vapor deposition (CVD), low-pressure chemical vapor deposition (LPCVD), low-temperature chemical vapor deposition (LTCVD), rapid thermal chemical vapor deposition (RTCVD), plasma-enhanced chemical vapor deposition (PECVD), atomic layer deposition (ALD), physical vapor deposition (PVD), molecular beam deposition (MBD), another suitable method, or a combination thereof. Next, a patterned photoresist layer (not shown) is used as an etching mask. The absorber layer 22 is patterned by an etching process, for example, reactive ion etch (RIE), neutral beam etch (NBE), another suitable method, or a combination thereof, to form a patterned absorber layer 22, exposing a portion of the first semiconductor layer 18. The patterned photoresist layer is then removed by an etching process or another suitable method.

Figure 3F:
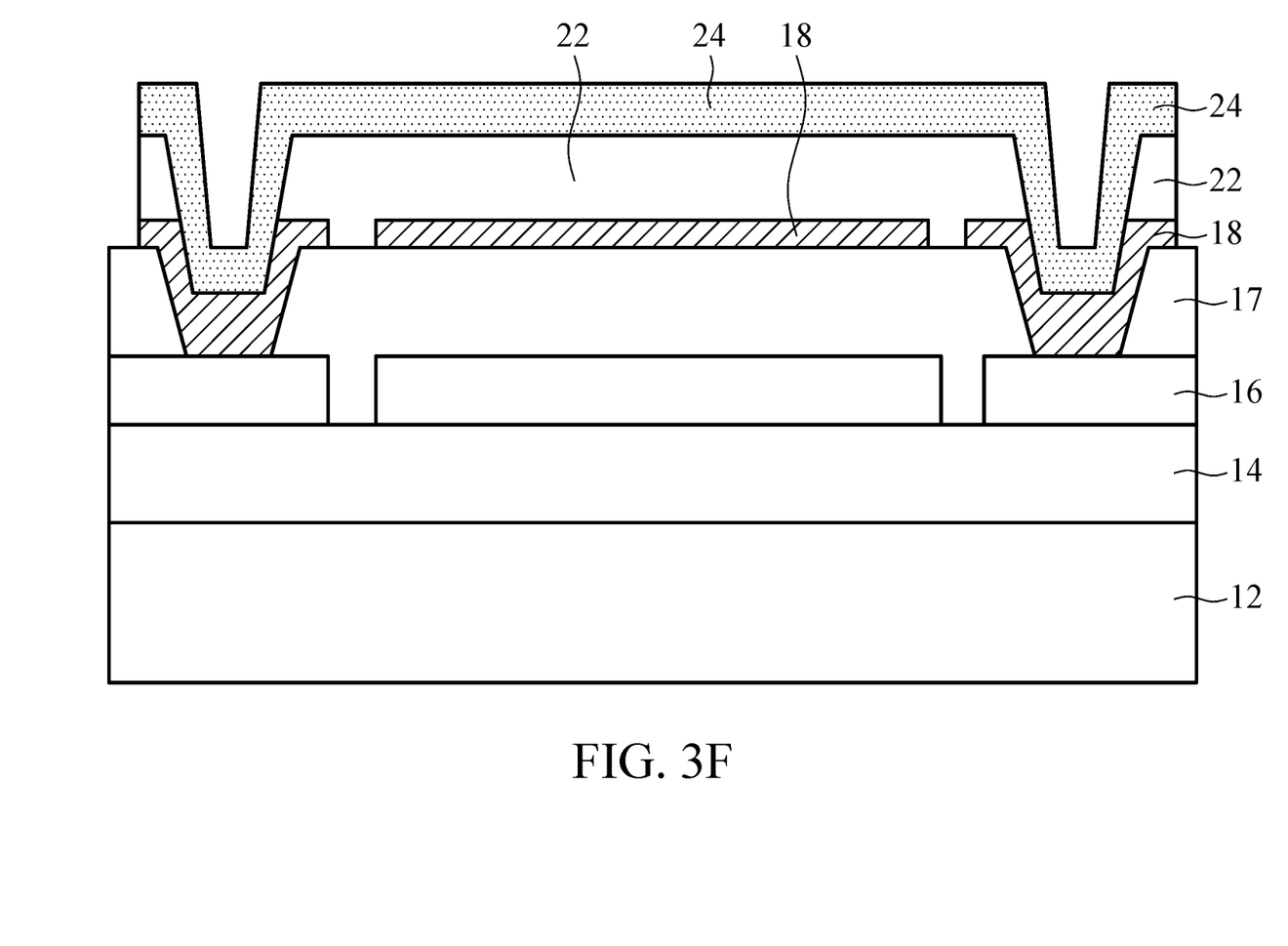

As shown in FIG. 3F, a second semiconductor layer 24 is formed on the patterned absorber layer 22 and electrically connected to the first semiconductor layer 18. In some embodiments, the second semiconductor layer 24 may be formed by, for example, sputtering, spin-coating, chemical vapor deposition (CVD), low-pressure chemical vapor deposition (LPCVD), low-temperature chemical vapor deposition (LTCVD), rapid thermal chemical vapor deposition (RTCVD), plasma-enhanced chemical vapor deposition (PECVD), atomic layer deposition (ALD), physical vapor deposition (PVD), molecular beam deposition (MBD), another suitable method, or a combination thereof. In some embodiments, in the step of forming the second semiconductor layer 24, when a deposition method is used and silicon germanium (SiGe) is used as the material of the second semiconductor layer 24, the operating temperature is between about 350° C. and 420° C. The flow rate of silane ($SiH_4$) gas is between about 20 sccm and 200 sccm. The flow rate of germane ($GeH_4$) gas is between about 2 sccm and 40 sccm. In the present embodiment, the difference in temperature coefficient of resistance (TCR) between the first semiconductor layer 18 and the second semiconductor layer 24 is generated by adjusting process parameters (such as temperature, flow rate of gas, etc.). For example, the temperature coefficient of resistance (TCR) of the second semiconductor layer 24 is about 20 to about 40 times that of the first semiconductor layer 18. As shown in FIG. 3F, the first semiconductor layer 18 and the second semiconductor layer 24 cover the absorber layer 22. When the materials of the sacrificial layer 17 and the absorber layer 22 are the same, the absorber layer 22 covered by the first semiconductor layer 18 and the second semiconductor layer 24 can be prevented from damaging during the process of removing the sacrificial layer 17.

Figure 3G:
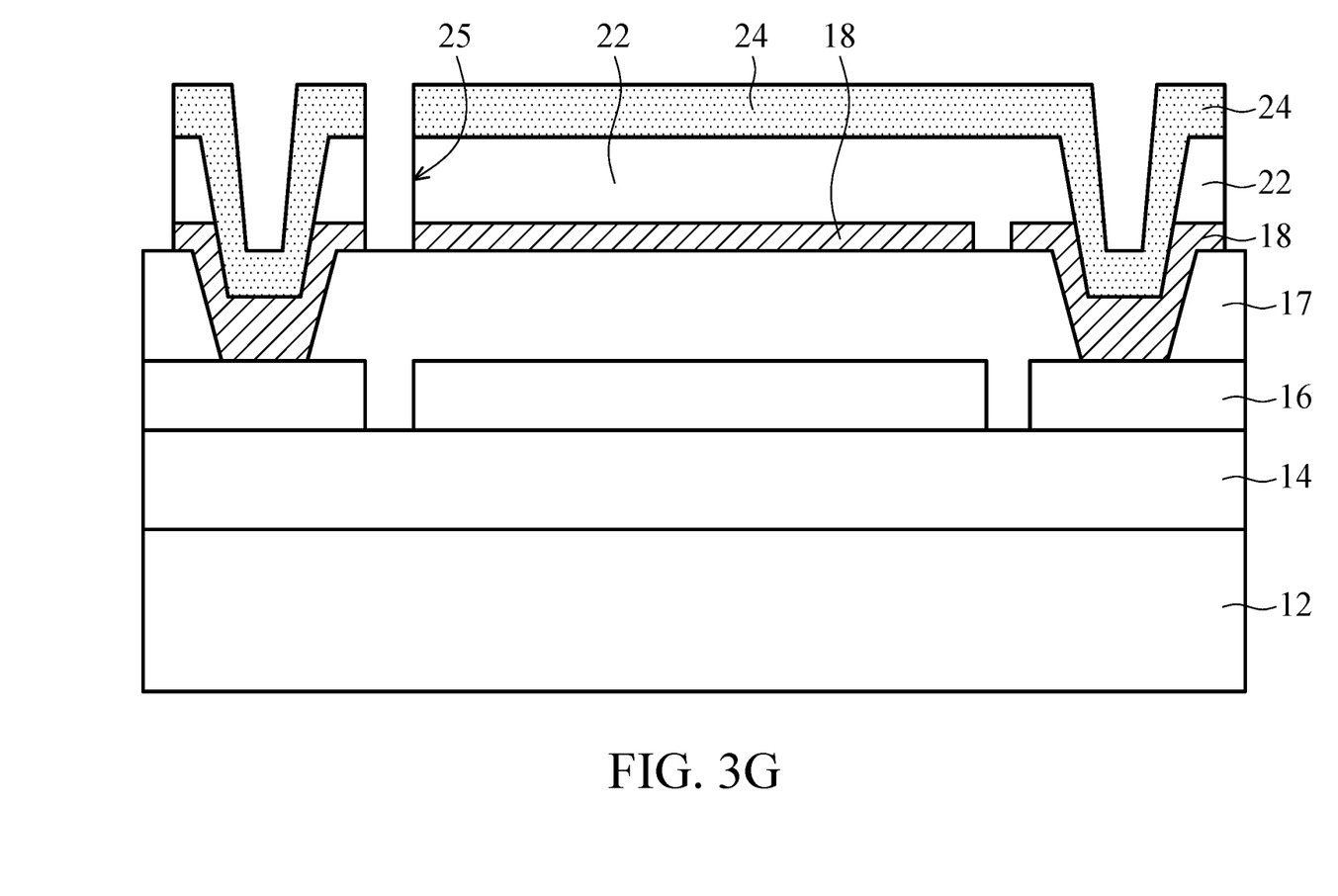

As shown in FIG. 3G, the second semiconductor layer 24, the absorber layer 22 and the first semiconductor layer 18 are etched to form an opening 25, exposing a portion of the sacrificial layer 17. For example, a patterned photoresist layer (not shown) is used as an etching mask. The second semiconductor layer 24, the absorber layer 22 and the first semiconductor layer 18 are etched by an etching process, such as reactive ion etch (RIE), neutral beam etch (NBE), another suitable method, or a combination thereof, to form the opening 25, exposing a portion of the sacrificial layer 17. The patterned photoresist layer is then removed by an etching process or another suitable method. The first semiconductor layer 18, the absorber layer 22 and the second semiconductor layer 24 are stacked to form the core region of the infrared device, which has functions of absorbing and sensing infrared light. In order to suspend the three-layer sensing structure, the supporting beam supporting the sensing structure are further defined by etching.

Figure 3H:
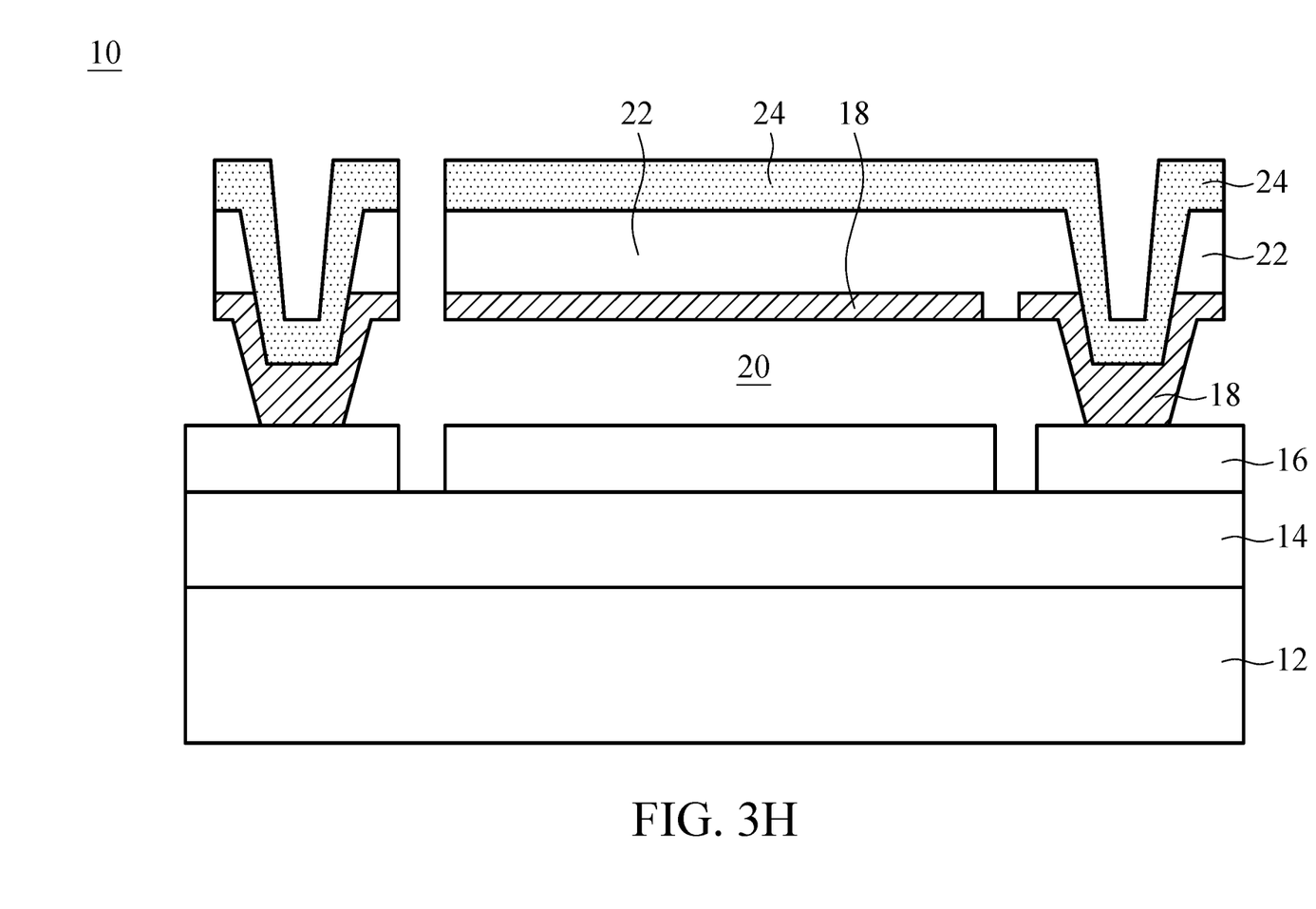

As shown in FIG. 3H, the sacrificial layer 17 is removed by, for example, wet etching process, to form a cavity 20 between the first semiconductor layer 18, the metal layer 16 and the insulating layer 14. Therefore, the fabrication of the infrared device 10 is completed.

In the present disclosure, in addition to reducing thermal noise, the infrared device (i.e. using two or more silicon-germanium (SiGe) materials with different temperature coefficient of resistance (TCR) by at least 20 to 40 times) can also improve process stability and reduce the impact of residual stress on component flatness. That is, replacing existing metal with low-TCR silicon-germanium material in supporting beamdesign has at least the following benefits, including: (1) the TCR of supporting beam is reduced (for example, the TCR of the low-TCR silicon-germanium material can reach 0.05% which is much less than that of titanium (0.38%)), and the noise due to thermal conduction is reduced; (2) the amount of thermal conduction dissipating through the supporting beam is reduced (for example, the thermal conductivity coefficient of silicon-germanium material is about 2.6 W/mK which is about 10 times smaller than that of titanium (22.4 W/mK), and the thermal insulation effect is better than titanium), and the noise due to thermal conduction is reduced; (3) the residual stress stability of supporting beam is improved (for example, the low-TCR silicon-germanium material grown on the oxide layer has stable residual stress and is not easy tovary, which facilitates to reduce manufacturing mismatches, however, titanium is often affected by the subsequent process temperature, and the residual stress is prone to drastic changes); and (4) the silicon-germanium material has a high selectivity to the etching solution and is resistant to etching, while titanium is not resistant to etching and is easily damaged.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An infrared device, comprising:
   a substrate;
   a metal layer disposed on the substrate;
   a first semiconductor layer disposed on the substrate, wherein a cavity is formed between the first semiconductor layer and the metal layer, and the first semiconductor layer is electrically connected to the metal layer;
   an absorber layer disposed on the first semiconductor layer; and
   a second semiconductor layer disposed on the absorber layer and electrically connected to the first semiconductor layer, wherein a temperature coefficient of resistance (TCR) of the first semiconductor layer is different from that of the second semiconductor layer.

2. The infrared device as claimed in claim 1, wherein the first semiconductor layer and the second semiconductor layer comprise silicon germanium (SiGe).

3. The infrared device as claimed in claim 1, wherein the temperature coefficient of resistance (TCR) of the first semiconductor layer is smaller than that of the second semiconductor layer.

4. The infrared device as claimed in claim 3, wherein the temperature coefficient of resistance (TCR) of the second semiconductor layer is 20 to 40 times that of the first semiconductor layer.

5. The infrared device as claimed in claim 1, wherein the absorber layer comprises silicon oxide, silicon nitride or silicon oxynitride.

6. The infrared device as claimed in claim 1, further comprising a third semiconductor layer disposed on the second semiconductor layer.

7. The infrared device as claimed in claim 6, wherein a total temperature coefficient of resistance (TCR) of the second semiconductor layer and the third semiconductor layer is 20 to 40 times the temperature coefficient of resistance (TCR) of the first semiconductor layer.

8. An infrared device, comprising:
   a substrate;
   a metal layer disposed on the substrate;
   a first silicon-germanium layer disposed on the substrate, wherein a cavity is formed between the first silicon-germanium layer and the metal layer, and the first silicon-germanium layer is electrically connected to the metal layer;
   an absorber layer disposed on the first silicon-germanium layer; and
   a second silicon-germanium layer disposed on the absorber layer and electrically connected to the first silicon-germanium layer, wherein a temperature coefficient of resistance (TCR) of the first silicon-germanium layer is different from that of the second silicon-germanium layer.

9. The infrared device as claimed in claim 8, wherein the temperature coefficient of resistance (TCR) of the first silicon-germanium layer is smaller than that of the second silicon-germanium layer.

10. The infrared device as claimed in claim 9, wherein the temperature coefficient of resistance (TCR) of the second silicon-germanium layer is 20 to 40 times that of the first silicon-germanium layer.

11. The infrared device as claimed in claim 8, further comprising a third silicon-germanium layer disposed on the second silicon-germanium layer.

12. The infrared device as claimed in claim 11, wherein a total temperature coefficient of resistance (TCR) of the second silicon-germanium layer and the third silicon-germanium layer is 20 to 40 times the temperature coefficient of resistance (TCR) of the first silicon-germanium layer.

13. A method for manufacturing an infrared device, comprising:
   providing a substrate;
   forming a metal layer on the substrate;
   forming a sacrificial layer on the metal layer;
   forming a first silicon-germanium layer on the sacrificial layer and electrically connected to the metal layer;
   forming an absorber layer on the first silicon-germanium layer;
   forming a second silicon-germanium layer on the absorber layer and electrically connected to the first silicon-germanium layer, wherein a temperature coefficient of resistance (TCR) of the first silicon-germanium layer is different from that of the second silicon-germanium layer; and
   removing the sacrificial layer to form a cavity between the first silicon-germanium layer and the metal layer.

14. The method for manufacturing an infrared device as claimed in claim 13, wherein the step of forming the first silicon-germanium layer is performed at a temperature that is between 400° C. and 470° C.

15. The method for manufacturing an infrared device as claimed in claim 13, wherein a flow rate of silane ($SiH_4$) gas in the step of forming the first silicon-germanium layer is between 5 sccm and 50 sccm.

16. The method for manufacturing an infrared device as claimed in claim 13, wherein a flow rate of germane ($GeH_4$) gas in the step of forming the first silicon-germanium layer is between 1 sccm and 12 sccm.

17. The method for manufacturing an infrared device as claimed in claim 13, wherein the step of forming the second silicon-germanium layer is performed at a temperature that is between 350° C. and 420° C.

18. The method for manufacturing an infrared device as claimed in claim 13, wherein a flow rate of silane ($SiH_4$) gas in the step of forming the second silicon-germanium layer is between 20 sccm and 200 sccm.

19. The method for manufacturing an infrared device as claimed in claim 13, wherein a flow rate of germane ($GeH_4$) gas in the step of forming the second silicon-germanium layer is between 2 sccm and 40 sccm.

20. The method for manufacturing an infrared device as claimed in claim 13, further comprising forming a third silicon-germanium layer on the second silicon-germanium layer.

\* \* \* \* \*